Dec. 10, 1940.  H. W. ROGERS  2,224,235
PEELING APPARATUS
Filed April 19, 1938   2 Sheets-Sheet 1
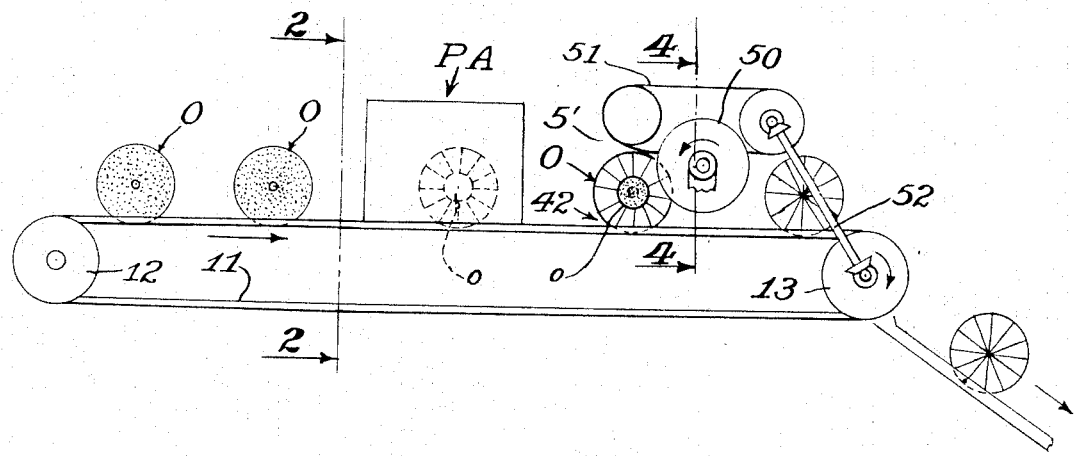
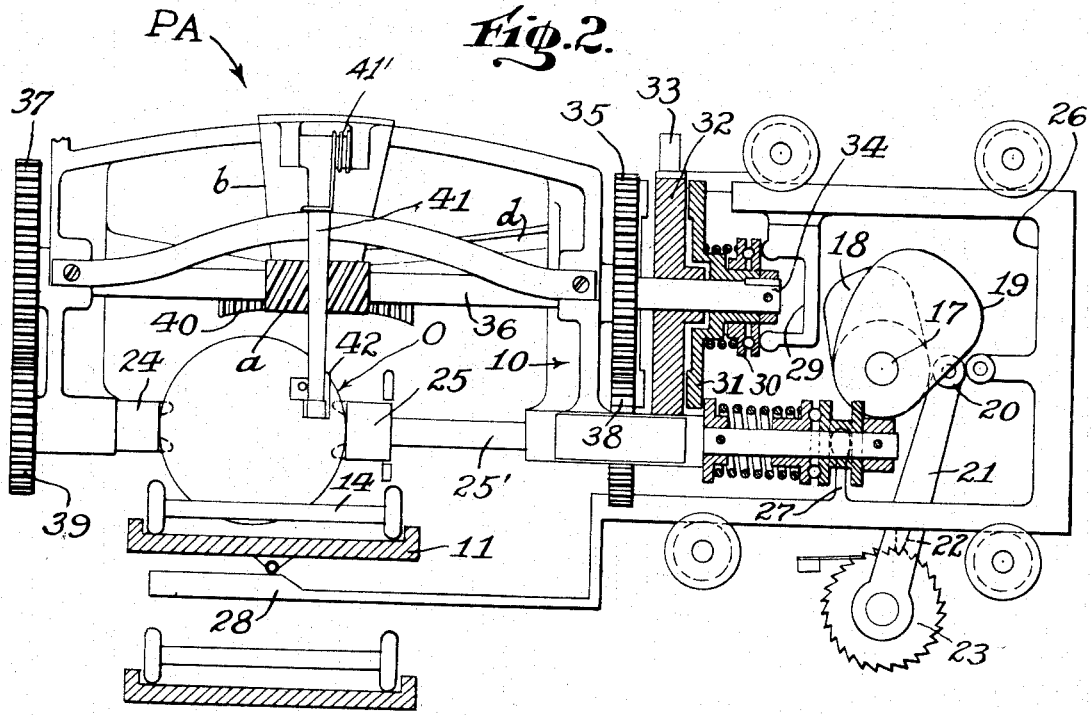
INVENTOR.
HARRISON W. ROGERS
BY
ATTORNEY.

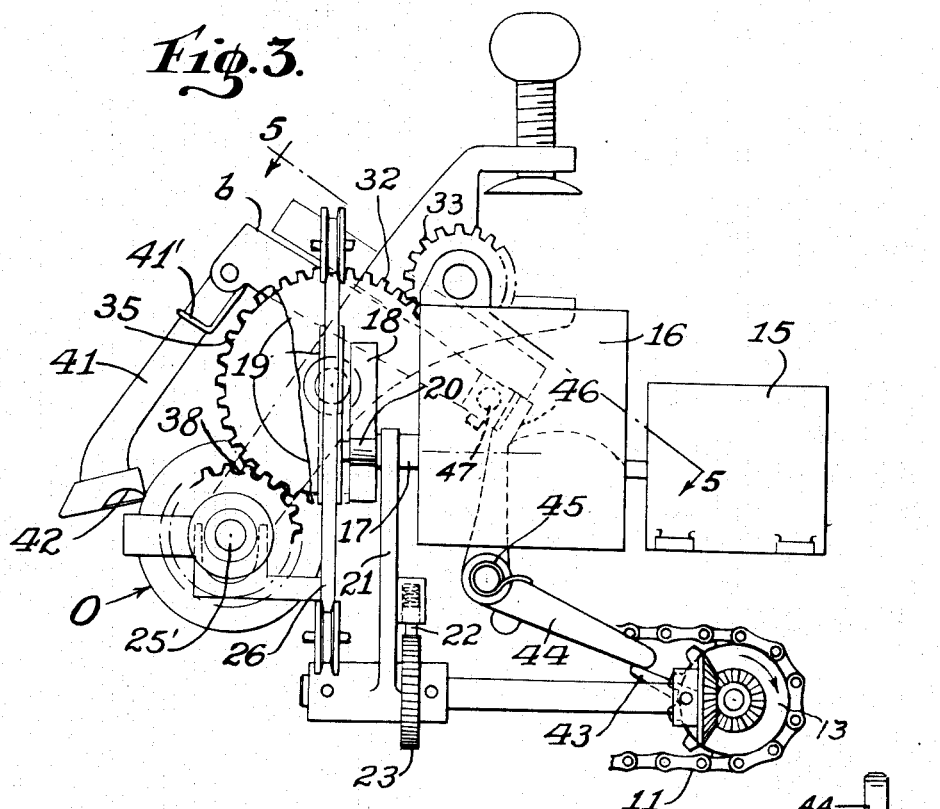
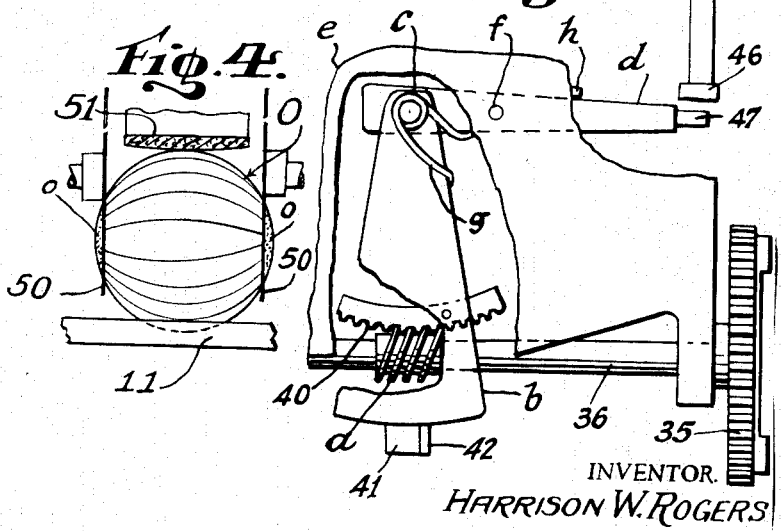

Patented Dec. 10, 1940

2,224,235

UNITED STATES PATENT OFFICE 2,224,235

PEELING APPARATUS

Harrison W. Rogers, Sebring, Fla.

Application April 19, 1938, Serial No. 202,817

3 Claims. (Cl. 146—43)

This invention relates to improvements in peeling apparatus, and relates more particularly to an apparatus for removing the rind or skin from fruit, such as oranges and grapefruit, so that the juice globules are not ruptured, and so that the fruit is clean peeled, and none of the contaminated portion of the rind or skin remains.

In carrying out this invention the body rind paring or peeling mechanism is the well-known and usual machine having two holding chucks, one or both of which are simultaneously rotated, in combination with a swingingly mounted knife carrying arm, driven by a worm gear to carry it in the paring direction with means for releasing the worm gears, so that a spring acts to return the arm and its knife to initial position after the knife has completed its body rind peeling action. These machines are usually hand-operated, so it is the object of this invention to utilize this mechanism and in combination with a novel fruit feeding mechanism and cams to present the fruit to the chucks, rotate the chucks during the paring action of the knife, release the knife for return action at the end of the paring operation and while the chucks are halted, release the fruit from the chucks, and carry the fruit thus pared to a polar ends removing mechanism.

In the accompanying drawing:

Figure 1 is a side elevation, more or less in diagram of the complete machine.

Figure 2 is a section taken on line 2—2 thereof, on an enlarged scale and in greater detail.

Figure 3 is a side elevation, partly in section on an enlarged scale of the mechanism at the body peeling mechanism.

Figure 4 is a section on line 4—4 of Fig. 1.

Figure 5 is a top plan view of the right hand side of the paring machine per se, portions of which are broken away to show the knife carrier operating means.

Referring to the drawings the numeral 10 designates a framework of the peeling apparatus PA, which carries thereon a feed belt 11, operated and guided by the sprockets 12 and 13 and for straight line movement. This belt is provided with receptacles 14, spaced equi-distantly apart, one to each article to be peeled, such for instance as an orange O, which is placed by hand upon the belt in its receptacle with its polar axis transversely of the belt.

A motor 15, is so geared through a gear box 16, so that a shaft 17 is rotated and in turn rotates the two side-by-side cams 18 and 19.

The cam 18 at the proper time acts upon the roller 20, in the free end of the lever 21, whose pawl 22 engages the ratchet 23, and imparts rotary motion for a predetermined distance to the sprocket 13, and consequently to the belt. Thus the belt is moved, and in turn causes the orange to be placed at a point so that its polar axis, including its stem and bud are adjacent to the chucks 24 and 25, the latter of which is slidably mounted and at this time, in its extreme released position.

At this instant, the cam 19 permits the slidable frame 26 to permit the yoke 27 to release the shaft 25', so that the chuck 25 engages the orange, while the cam 19 continues to move this frame to the left in Fig. 2, so that the flat cam 28 is moved from below the belt, and permits the belt at this point to sag, and be free of the fruit. The chucks 24 and 25 are now rotated, and the held fruit is rotated, through the medium of yoke 29 carried by the slidable frame, and pressed against the spring returned clutch mechanism 30, which permits its disk 31 to engage the rotating gear 32, which is driven continuously by the motor through the small gear 33.

A shaft 34 is connected to the disk 31 and rotates therewith and also rotates the large gear 35. Through the shaft 36 which is an extension of shaft 34 the large gear 37 at the opposite side of the main frame is rotated, and through the gears 35 and 37 the small gears 38 and 39 are respectively driven, to in turn drive in synchronism the two chucks 24 and 25 that rotate the fruit.

The shaft 36 is fitted with a worm $a$, which meshes with a worm gear sector 40, which sector in turn is secured to an arm $b$. This arm $b$ is secured to a lever $d$, which in turn is pivoted to the frame $e$ at $f$. A strong coil spring $g$ tends to rotate the arm $b$ clockwise with respect to the lever $d$. This spring action also keeps the sector 40 in mesh with the warm $a$. Stop $h$ is in the path of the lever $d$ and holds it from further movement in an anti-clockwise direction (Fig. 5).

During the peeling operation, the worm $a$ drives the sector 40 and the arm $b$ so that they rotate about the pivot $c$. When the member 46 moves to the left (Fig. 3) contacting the end 47 of the lever $d$, it causes the lever $d$ to rotate clockwise (Fig. 5) about its pivot $f$, disengaging the sector 40 from the worm $a$. As soon as this disengagement takes place, the spring $g$ forces the arm $b$ to rotate clockwise about its pivot $c$ and thus the knife carrying arm and its paring knife is returned to starting position.

The arm 41 carrying its knife, as is usual with paring machines of this type, has a spring 41', which resiliently holds the arm and knife toward the fruit being pared.

The belt is moved the same distance as before described, and the peeled orange is halted at a position, under the forward end of the holding belt 51, while the next succeeding orange, is operated upon to have its body rind removed.

When the belt is moved again, however, the first peeled orange, now is moved between the rotating disk knives 50, which are so adjusted as to cut off the rind buttons left at the bud and stem portions of the orange, and not to rupture the fruit pods or globules at these points. The next movement of the belt, then causes the completely peeled orange to leave the pelt, and be delivered to an extractor, not shown, or any desired point.

These knives 50 may be operated by an independent motor, or from the motor 15, while the holding belt 51, is operated from the sprocket 13, by the shaft 52, as this belt is only moved when the main belt is moved, and this belt 51 is narrower than the main belt, while the knives 50, while adjustable are slightly farther apart than the width of the narrow holding belt 51.

It will thus be seen that the body rind paring or peeling mechanism is of well-known construction, except that in this case both chucks are driven in synchronism and prevents any drag upon one end of the fruit, as is the case when only one chuck is driven. Also that the machine is in reality placed upside down in this instance, so that the fruit can more easily be fed to and from the chucks, and also so that the vertically swinging trigger 47 may be pressed upon by the engaging end 46 of the bell crank lever 44 and swing the knife carrying arm 41 and its carrier vertically, and at the same time release the worm gears so that the usual return spring for the carrier will move the arm 41 to the right in Fig. 2, to initial return position, at which time the trigger has been released to its spring 45 and the carrier is permitted to cause the worm gears to engage. This operation in the hand operated mechanism here shown, is released by the operator.

What is claimed, as new, is:

1. A peeling mechanism in combination with the body rind peeling mechanism, of an article delivering mechanism for presenting one article at a time to the body rind peeling mechanism and for taking peeled objects away from the same, said body rind peeling mechanism including a fixed and a slidably mounted chuck normally in passive position, gearing for operating the chucks in unison, power means for driving said gearing, a spring returned clutch forming a driving connection between said gearing and said power means, a drive shaft, two cams driven thereby, clutch actuating means controlled by one cam to actuate the clutch to drive both chucks from the prime mover, and means operated by the second cam to impart intermittent step-by-step movement to the article delivering mechanism.

2. A peeling machine, including in combination a rind peeling mechanism having two rotatable chucks for receiving the fruit, one of the chucks being spring returned and slidable to permit the easy insertion and release of the fruit, a flexible endless fruit carrier movable below said chucks in a position to normally present the axis of the fruit between the chucks, a prime mover, a slidable frame, means carried by the frame to move the chuck in to engagement with the fruit, a cam actuated by the prime mover for imparting motion to the frame, means actuated by the slidable frame as it is moved in one direction to permit the carrier to sag adjacent to the chucks and free the fruit to be rotated by the chucks, means controlled by the slidable frame for actuating the chucks, a spring returned swingingly mounted knife, means actuated simultaneously with the chucks to cause the knife to traverse the chuck held fruit from one chuck to the other, means actuated by the slidable frame to release the knife to the action of its spring at the completion of the peeling operation, the slidable frame being actuated at the same time in a reverse direction to elevate the carrier and receive the release fruit, means actuated by the prime mover for imparting step-by-step movement to the carrier, the carrier being stationary prior to and during the peeling operation, cutters for removing the rind at the ends of the fruit spaced from the rind peeling mechanism, and means operated by the carrier for holding the fruit against turning upon the carrier when the carrier is moving the fruit to said cutters.

3. A peeling machine, including in combination a rind peeling mechanism having two rotatable chucks for receiving the fruit, one of the chucks being spring returned and slidable to permit the easy insertion and release of the fruit, a flexible endless fruit carrier movable below said chucks in a position to normally present the axis of the fruit between the chucks, a prime mover, a slidable frame, means carried by the frame to move the chuck into engagement with the fruit, a cam actuated by the frame as it is moved in one direction to permit the carrier to release the fruit to the gripping of the chucks, means controlled by the frame for actuating the chucks, a spring returned swingingly mounted knife, means actuated simultaneously with the chucks to cause the knife to traverse the chuck held fruit, means actuated by the frame to release the knife to the action of its spring at the completion of the peeling operation, the sliding frame being actuated simultaneously with the completion of the peeling operation in a reverse direction to permit the fruit to again engage the carrier, and means actuated by the prime mover for imparting step-by-step movement to the carrier, the carrier being stationary prior to and during the peeling operation.

HARRISON W. ROGERS.